350-96.25 SR
XR 3,788,304
SEARCH ROOM

United Stat
Takahashi
SUBSTITUTE FOR MISSING XR
[11] 3,788,304
[45] Jan. 29, 1974

[54] ENDOSCOPE

[75] Inventor: Nagashige Takahashi, Tokyo, Japan

[73] Assignee: Olympus Optical Co. Ltd., Tokyo, Japan

[22] Filed: June 15, 1971

[21] Appl. No.: 153,341

Related U.S. Application Data

[63] Continuation-in-part of Ser. No. 856,049, Sept. 8, 1969, abandoned.

[52] U.S. Cl. .................................................. 128/6
[51] Int. Cl. .................................................. A61b 1/06
[58] Field of Search .......................... 128/4, 6, 349 R

[56] References Cited

UNITED STATES PATENTS

| | | | |
|---|---|---|---|
| 2,472,483 | 6/1949 | Krippendorf | 128/349 R |
| 2,472,484 | 7/1949 | Krippendorf | 128/349 R |
| 3,132,646 | 5/1964 | Hett | 128/6 |
| 3,162,214 | 12/1964 | Bazinet, Jr. | 128/4 X |
| 3,253,524 | 5/1966 | Ashizawa et al. | 128/6 UX |
| 3,470,876 | 10/1969 | Barchilon | 128/4 X |
| 3,572,325 | 3/1971 | Bazell et al. | 128/6 |
| 3,583,393 | 6/1971 | Takahashi | 128/4 |

*Primary Examiner*—Channing L. Pace
*Attorney, Agent, or Firm*—Otto John Munz

[57] ABSTRACT

An endoscope includes a distal end portion adapted to be inserted into a hollow portion for the inspection thereof, a controllably bendable tube connected to the distal end portion, a yieldably flexible tube connected to the controllably bendable portion, and a proximal end portion including a control housing connected to the yieldably flexible tube. An image of an object formed in the distal end portion is transmitted through an image transmitting optical system extending through the controllably bendable tube and the yieldably flexible tube to the control housing thereby permitting the thus transmitted image to be viewed through ocular means or photographed by a camera in the control housing. The controllably bendable tube is controllably bent by string means connected at its distal end to the forward end portion and extending through the controllably bendable tube and the yieldably flexible tube to the control housing where the end of the string means is connected to a control mechanism so as to be actuated thereby for bending the controllably bendable tube. The forward end part of the yieldably flexible tube is made to have a greater pliability than that of the remaining part, and the pliability of the controllably bendable tube is selected to be greater than that of the forward end of the yieldably flexible tube, so that the distal end portion is easily inserted even into a narrow sharply bent passage having a substantially U-shape configuration with the portion thereof turned back upon itself by the angle of about 180° by virtue of the difference in the curvature of the controllably bendable tube and the forward end of the yieldably flexible tube and the remaining part thereof due to the difference in the pliability thereof when the controllably bendable tube is inserted into the narrow bent passage and bent by the actuation of the string means.

1 Claim, 6 Drawing Figures

PATENTED JAN 29 1974

3,788,304

SHEET 1 OF 2

INVENTOR
NAGASHIGE TAKAHASHI,

BY Otto John Munz
ATTORNEY

INVENTOR
NAGASHIGE TAKAHASHI
BY [signature]
ATTORNEY

ENDOSCOPE

CROSS-REFERENCE TO RELATED APPLICATION

This application is a continuation-in-part of application U.S. Ser. No. 856,049 filed by the same applicant and now abandoned.

BACKGROUND OF THE INVENTION

The present invention relates to an endoscope and, more particularly, to a controllably bendable tube in the endoscope which permits a distal end portion to be inserted into a narrow passage having a substantially U-shaped configuration wherein a portion of the tube is turned back upon itself by a angle of 180°.

In general, an endoscope comprises a distal end portion connected to a control housing through a flexible tube. The distal end portion is adapted to be inserted into a hollow portion in a body such as a living body. The light from an object in the hollow portion is received by an image forming optical system located in the distal end portion through a viewing window provided in the distal end portion. Thereby an image is focused in the forward end of an image transmitting optical system extending from the distal end portion through the flexible tube to a proximal end portion including a control housing. The thus focused image is transmitted through the image transmitting optical system to the rearward end thereof thereby permitting the image to be viewed through ocular means or photographed by a camera provided in the control housing at a position behind the rearward end of the image transmitting optical system. A light conducting optical system may be provided which extends through the flexible tube with the forward end thereof terminating in the distal end portion. The rearward end of the flexible tube extends out of the control housing so as to be connected to an exterior light source so that the illuminating light from the light source is transmitted through the light conducting fiber optical system to the forward end thereof thereby permitting the object to be illuminated by the light emanated from the forward end of the light conducting optical system through an illuminating window provided in the distal end portion. In order to facilitate the insertion of the distal end portion into a narrow curved passage in the body, a controllably bendable tube may be interposed between the distal end portion and the forward end of the flexible tube. String means are provided extending through the controllably bendable tube and the flexible tube with the forward ends thereof secured to the rearward end of the distal end portion while the rearward ends of the string means are connected to a control mechanism provided in the control housing so that the controllably bendable tube can be bent by the string means actuated by the control mechanism.

In the prior art endoscope as described above, the controllably bendable tube is in the form of a single uniformly bendable tube section which can merely be bent in a uniform curvature. Therefore, when the distal end portion of the endoscope is to be inserted in a narrow curved passage having a substantially shape configuration bent back upon itself by an angle of 180°, it is very difficult to introduce the distal end portion into the bent back portion of the passage in the U-shape unless the operator has sufficient experience to skillfully manipulate the endoscope. Thus, the person to whom the endoscope is applied is required to endure substantial pain for a relatively long time when the endoscope is being manipulated.

The present invention aims at avoiding the above described disadvantages and providing a novel and useful endoscope.

SUMMARY OF THE INVENTION

An object of the present invention is to provide a novel and useful endoscope in which the above described disadvantages of the prior art endoscope are avoided.

Another object of the present invention is to provide a novel and useful endoscope in which the distal end portion thereof can be easily inserted by the manipulation of the endoscope even into a narrow curved passage having a U-shape wherein a portion thereof is turned back upon itself by an angle of 180°.

To achieve the above objects, the endoscope constructed in accordance with the present invention is characterized by the controllably bendable tube thereof which is comprised of three bendable tube sections connected in series to each other. The pliability of each of the tube sections is different from each other. The foremost tube section that is connected to the distal end portion of the endoscope has the greatest pliability. While the rearmost tube section has the smallest pliability. The intermediate tube section interposed between the foremost and the rearmost tube sections is of intermediate pliability. Thereby the curvature of each of the three tube sections is different from each other. The foremost one has the greatest curvature while the rearmost one has the smallest curvature when they are controllably bent by the manipulation of the endoscope. This action permits the distal end portion to be easily inserted in a narrow curved passage having a substantially U-shape configuration wherein a portion thereof is bent back upon itself by the angle of 180° by virtue of the difference in the curvature of the three bendable tube sections of the controllably bendable tube due to the difference in the pliability thereof.

In accordance with another feature of the present invention, the controllably bendable tube is made to have the highest pliability while the forward end of the yieldably flexible tube has a smaller pliability then the controllably bendable tube and the remaining part of the yieldably flexible tube is made to have the smallest pliabilty. Therefore, when the distal end portion is inserted into a narrow bent passage and the controllably bendable tube is bent by the operation of the string means so as to follow the curvature of the bent passage, the controllably bendable tube is bent in the smallest radius of curvature. Further the forward end of the yieldably flexible tube is bent in a relatively small radius of curvature in comparison with the remaining part of the yieldably flexible tube so as to appropriately follow the bent passage so that the distal end portion can be easily introduced into the desired hollow portion through the bent passage without fail.

DETAILED DESCRIPTION OF THE PREFERRED EMBODIMENT

Figures 1, 2, 3, 4, 5:
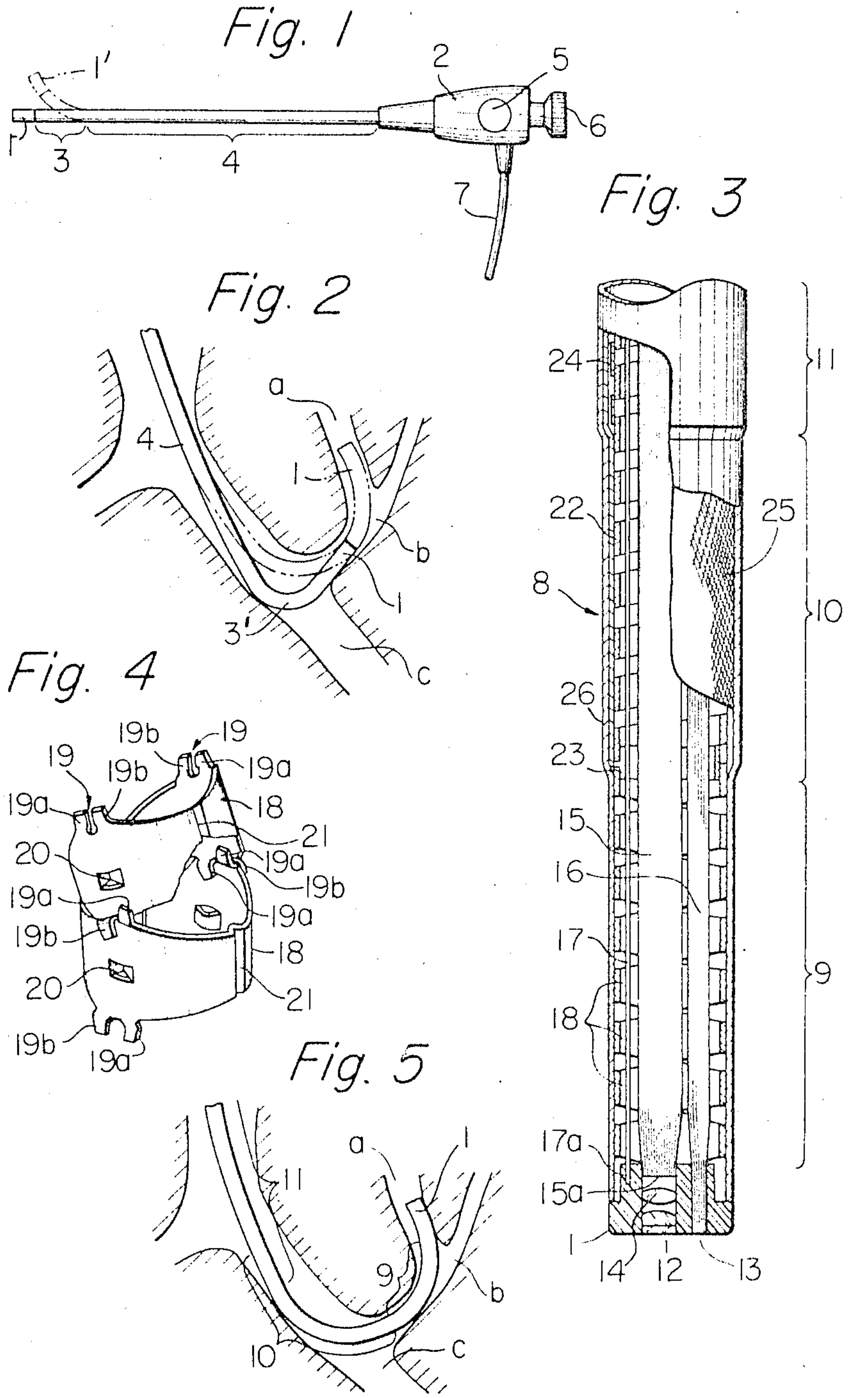
FIG. 1 is a perspective view showing a conventional endoscope.
FIG. 2 is a schematic view showing the manner of inserting the distal end portion of the endoscope into a curved narrow passage such as a bronchus of a human body.
FIG. 3 is a fragmentary sectional view showing the construction of the controllably bendable tube of the endoscope constructed in accordance with the present invention.
FIG. 4 is a fragmentary perspective view showing an example of the annular ring members forming the bendable tube section of the controllably bendable tube shown in FIG. 3.
FIG. 5 is a schematic view similar to FIG. 2 but showing the manner how the distal end portion of the endoscope of the present invention is inserted in a U-shaped narrow passage such as the bronchus of the human body.

Referring to FIG. 1 showing a conventional endoscope, it is comprised of a diatal end portion 1 connected to a proximal end portion including a control housing 2 through an intermediate portion including a controllably bendable elongated tube 3 connected to the distal end portion 1 and a yieldably flexible elongated tube 4 connected to the rearward end of the controllably bendable tube 3. String means (not shown) are connected at their forward ends to the rearward end of the diatal end portion 1 and extend through the controllably bendable tube 3 and the yieldably flexible tube 4 to the control housing 2 in which the rearward ends of the string means are connected to a control mechanism (not shown) located in the control housing 2*a*. An operating knob 5 is provided on the control housing 2; for operating the control mechanism. Thus, the distal end portion 1 is bent to a position such as shown by the reference numeral 1' through the actuation of the string means by the operating knob 5 so as to controllably bend the controllably bendable tube 3.

An image forming optical system is provided in the distal end portion 1 which receives light from an object through a viewing window provided in the wall of the distal end portion 1 and focuses an image of the object on the forward end of an image transmitting optical system extending through the controllably bendable tube 3 and the yieldably flexible tube 4 to the control housing 2. The image of the object thus formed on the forward end of the image transmitting optical system is transmitted therethrough to the rearward end thereof and is viewed through ocular means 6 or photographed by a camera provided in the control housing 2 behind the rearward end of the image transmitting optical system.

In order to illuminate the object, a light conducting optical system 7 is provided which extends through the controllably bendable tube 3 and the yieldably flexible tube 4 with the distal end terminating at the forward end portion 1 while the rearward end of the light conducting optical system extends out of the control housing 2 so as to be connected to an external light source (not shown). Thus, the light supplied from the light source is transmitted through the light conducting optical system to the forward end thereof so as to be emanated therefrom through an illuminating window provided in the distal end portion 1, whereby the object is illuminated.

In the prior art endoscope as described above, the controllably bendable tube 3 is made of a single uniformly bendable tubular structure capable of being bent merely in uniform curvature or is made of a hinged connection about which the distal end portion 1 is pivoted. Therefore, when the distal end portion 1 is inserted into a curved passage such as a bronchus as shown in FIG. 2, the bendable tube tends to be bent as shown by the reference numeral 3' so that it is urged into portion *c* and can not be introduced into the desired portion *a* through portion *b*.

If the distal end portion 1 is to be inserted with ease into the portion *a*, the general configuration of the bendable tube should be such as indicated by the chain line in FIG. 2.

The present invention makes it possible to bend the controllably bendable tube 3 in the form as shown the chain line in FIG. 2.

Now the construction of the controllably bendable tube characterizing the present invention will be described with reference to FIGS. 3 and 4.

Referring to FIG. 3, a controllably bendable elongated tube 8 of the endoscope of the present invention constitutes an intermediate portion and includes a first bendable tube section 9 connected at its forward end to the distal end portion 1, a second bendable tube section 10 connected at its forward end to the rearward end of the first bendable tube section 9 and a third bendable tube section 11 connected at its forward end to the rearward end of the second bendable tube section 10 and at its rearward end to the forward end of the yieldably flexible tube 4 of the endoscope.

In a conventional manner, the distal end portion 1 is provided with a viewing window 12 and an illuminating window 13. An objective lens 14 is located behind the viewing window 12 so as to receive the light from the object through the viewing window 12 so that an image of the object is focused on the forward end 15*a* of an image transmitting optical system 15 such as a fiber optical system extending through the controllably bendable tube 8 and the yieldably flexible tube to the control housing of the endoscope. Thus, the image of the object transmitted to the rearward end of the image transmitting optical system 15 therethrough is viewed by ocular means or photographed by a camera provided in the control housing in the manner as previously described.

One end of a light conducting optical system 16 such as a fiber optical system is secured in the illuminating window 13 and the light conducting optical system 16 extends through the controllably bendable tube 8 and the yieldably flexible tube to the control housing so as to illuminate the object in the manner as described previously.

String means 17 are secured at their forward ends 17*a* to the rearward end of the distal end portion 1 and extend through the controllably bendable tube 8 and the yieldably flexible tube into the control housing where the rearward ends of the string means 17 are connected to a control mechanism in the control housing so as to be actuated thereby to bend the controllably bendable tube 8 by the actuation of the string means 17 in the manner as described previously.

In accordance with the characteristic feature of the present invention, the first bendable tube section 9 is constructed so that the greatest pliability is given thereto in comparison with the second and third bendable tube sections 10, 11 while the third bendable tube section 11 has the smallest pliability with the second bendable tube section 10 being of the intermediate pliability. Consequently, the three bendable tube sections 9, 10 and 11 are bent in different curvatures from each other by the single actuation of the string means 17 when the string means 17 are controlled by the control mechanism thereby permitting the distal end portion 1 of the endoscope of the present invention to be easily inserted into a curved narrow passage having a substantial U-shape configuration having a portion thereof bent back upon itself by an angle of 180°.

To this end, the first bendable tube section 9 is constructed to include a plurality of annular ring members 18. Each ring member preferably is formed of a thin cylindrical plate and is arranged in series so as to pivot relative to each other. Each of the annular ring members 18 is provided at the respective ends thereof with diametrically opposite bifurcations 19, respectively. Each of the bifurcations has legs 19*a* and 19*b*. Leg 19*a* of the legs is offset in the radially inward position while the other leg 19*b* is off-set in the radially outward position as shown in FIG. 4. Thereby a pair of bifurcations 19 at one end of one of the annular ring members 18 snugly engages with the respective bifurcations 19 at the opposing end of the adjacent annular ring member 18, respectively. Each of the ends of the respective ring members 18 is slanted axially inwardly beginning at the respective bifurcations 19, thereby permitting the adjacent two annular ring members 18 to be easily pivoted about the line connecting the pair of diametrically opposite bifurcations 19 thereof. Recessed portions 20 are provided in the wall of each of the annular ring members 18 along the longitudinal lines each passing through the longitudinally arranged bifurcations 19 at the respective ends of each of the annular ring members 18. A string (not shown) is passed through each of the holes formed by the recessed portions 20 and is fixed at its one end to the foremost annular ring member 18 and at its other end to the rearmost annular ring member 18 in the series of the annular ring members 18 forming the first bendable section 9. Thus, the series of the annular ring members 18 are easily bendably connected to each other with the bifurcations 19 at one end of each of the ring members 18 pivotably engaged with the respective bifurcations 19 at the opposing end of the adjacent annular ring member 18. Each of the annular ring members 18 is formed with longitudinal grooves 21 in the wall thereof at diametrically opposite positions perpendicular to the diameter passing through the diametrically opposite bifurcations 19. The string means 17 are guided in the respective grooves 21 so that the actuation of the string means 17 are exactly transmitted to the distal end portion 1. The construction of the first bendable tube section 9 as described above provides the greatest pliability thereto. However, any alternative form of the first bendable tube section 9 may be adopted insofar as it provides the desired pliability thereof.

The second bendable tube section 10 comprises a helically wound thin strip member 22 that is connected at its forward end with the rearmost annular ring member 18 by means of a connecting ring 23. The construction of the second bendable tube section 10 provides a pliability smaller than the pliability of the first bendable tube section 9, i.e., the second bendable tube section 10 is bent by the actuation of the string means 17 in a curvature smaller than that of the first bendable tube section 9.

The third bendable tube section 11 comprises an additional helically wound thin strip members 24 in addition to the helically wound thin strip member 22 forming the second bendable tube section 10. The additional helically wound thin strip member 24 is closely wound around the helically wound strip member 22 in the opposite helical direction to the helical direction of the strip member 22. The construction of the third bendable tube section 11 described above provides the smallest pliability thereto in comparison with those of the first and second bendable tube section 9, 10. The pliability of the third section 11 is selected to be greater than that of the yieldably flexible tube 4.

In order to prevent the twisting of the second and third bendable tube sections 10, 11 about the longitudinal axis thereof, a tubular braid 25 woven in the net-like form is provided around the second and third bendable tube sections 10, 11.

The rearward end of the third bendable tube section 11 is connected to the forward end of the yieldably flexible tube of the endoscope.

A tubular pliable sheath 26 preferably made of a plastic or a rubber material is provided around the first, second and third bendable tube sections 9, 10, 11 so as to seal the same from the exterior.

In order to insure the positive controllable bending action of the first, second and third bendable tube sections 9, 10, 11 by the actuation of the string means 17 while the yieldably flexible tube is allowed to be freely bent following the passage through which it is inserted, closely wound substantially non-contractable coil members (not shown in FIG. 3) are provided around the respective string means 17. One end of each of the coil members is secured to the control housing while the other end terminates at the forward end of the yieldably flexible tube and is secured to the forward end of the yieldably flexible tube with sufficient slackening of the coil members being held with respect to the yieldably flexible tube so as to prevent the actuation of the string means 17 from being disturbed by the yieldable flexure of the yieldably flexible tube inserted in a curved passage.

As described above, since the first, second and third bendable tube sections 9, 10, 11 of the present invention have different pliabilities from each other, the distal end portion 1 can be easily inserted into a desired portion a such as a bronchus without the bent portion 10 being urged into a portion c as shown in FIG. 5. This action occurs because the three bendable tube sections 9, 10, 11 are positively bent in different curvatures as determined by their pliability, respectively, so as to facilitate the insertion of the forward end portion 1 even in a narrow curved passage of a substantial U-shape configuration.

The second and third bendable tube sections 10, 11 may be made of different construction insofar as they have desired pliability as described above.

Figure 6:
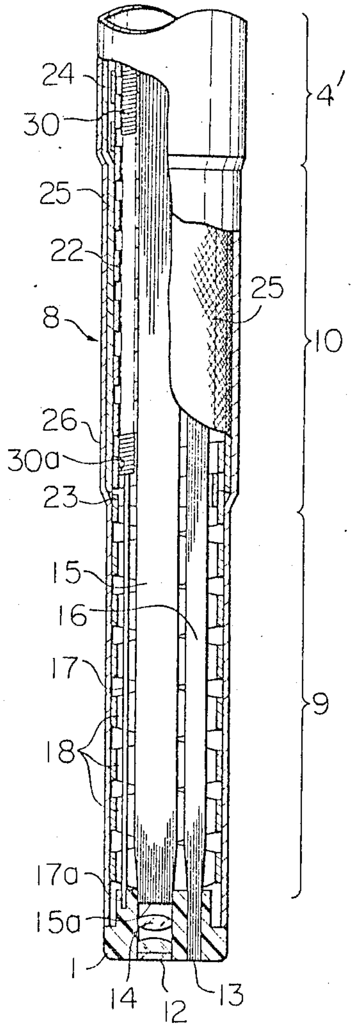
FIG. 6 is a fragmentary sectional view similar to FIG. 3 but showing another embodiment of the present invention.

FIG. 6 shows another embodiment of the present invention. This embodiment is similar to that shown in FIG. 3 except that a closely wound substantially non-contractable coil member 30 and located around each of the string means 17 extends to the forward end of the second section 10. And the forward end of the coil member 30 is fixedly secured to the forward end of the helically wound strip member 22 at 30*a*. Thereby only the first section 9 can be controllably bent by the operation of the string means 17 while the second section 10 is made to be yieldably bent following the curvature of the narrow bent passage through which the second section 10 is inserted. The third section 11 of FIG. 3 is omitted in the embodiment of FIG. 6. The elongated yieldably flexible tube 4′ has a smaller pliability than that of the section 10 and is directly connected to the second section 10. The construction of the tube 4′ may be made similar to that of the section 11 shown in FIG. 3. In other words, the section 10 and the tube 4′ constitute a yieldably flexible tube of the endoscope as a whole with the forward part 10 of a relatively short length having a pliability greater than that of the major remaining part 4′ of the yieldably flexible tube 4′ but smaller than that of the controllably bendable tube section 9.

This construction is particularly effective when the distal end portion 1 of the endoscope is inserted into a narrow bent back passage as shown in FIG. 2, because the yieldably flexible section 10 having a greater pliability than the tube 4′ can be easily bent following the curvature of the passage when the controllably bent section 9 is bent by the operation of the string means 17 as shown by the two dot chain line in FIG. 2. Thereby the dital end portion 1 of the endoscope can be easily introduced to the desired point. If the section 10 were not provided as is the case of a conventional type endoscope, the yieldably flexible tube 4′ tends to move forwardly past the point the bent passage is formed as shown by the full line in FIG. 2. This is due to the small pliability of the tube 4′ so that the distal end portion 1 cannot be properly introduced to the desired point. This is because the distal end portion 1 is retracted from the bent passage and moved forwardly together with the yieldably flexible tube 4′ over the bent passage.

Of course, a yieldably flexible section having a smaller pliability than that of the section 10 but greater than that of the tube 4′ may be interposed between the section 10 and the tube 4′ so as to facilitate the introduction of the distal end portion 1 into a hollow portion through a narrow passage bent back upon itself at an angle of about 180°.

I claim:

1. An endoscope adapted for insertion into a substantially U-shaped passage of a bronchus of a human body comprising in combination:

an elongated flexible distal end portion having forward and rearward ends and housing an image forming optical system;

a proximal end portion including a control housing;

an intermediate portion connecting said distal end portion and said proximal end portion; said intermediate portion including a controllably bendable elongated tube and a yieldably flexible elongated tube, said controllably bendable tube and said yieldably flexible tube having respective forward and rearward ends;

the forward end of said controllably bendable tube connected to said distal end portion and the rearward end thereof to said yieldably flexible tube;

the forward end of said yieldably flexible tube connected to aid controllably bendable tube and the rearward end thereof to said control housing;

said controllably bendable tube including a first bendable tube section and a second bendable tube section connected together, said first and second tube sections having respective forward and rearward ends, the forward end of said first bendable tube section connected to the rearward end of said distal end portion and the rearward end of said second bendable tube section connected to the forward end of said yieldably flexible tube;

said first bendable tube section including a plurality of annular ring members arranged in series lengthwise thereof and pivotably connected to each other at the diametrically opposite positions in the respective edges of each of said annular ring members so as to provide sufficient pliability thereof;

said second bendable tube section including a helically wound thin strip member;

said helically wound thin strip member structurally providing less pliability than said annular ring members;

the entire length of said yieldably flexible tube includes an additional helically wound thin strip member wound in the helical direction opposite to that of said helically wound thin strip member of said bendable tube section, said additional helically wound thin strip member providing a small pliability;

thereby the respective degrees of pliability of said distal end portion, said controllably bendable tube, and said yieldably bendable tube permitting the insertion of the respective pliable elements in said substantially U-shaped passage of the bronchûs;

an image transmitting optical system extending through said controllably bendable tube and said yieldably flexible tube, said image transmitting optical system having forward and rearward ends, the forward end of said image transmitting optical system operatively located behind and adjacent said image forming optical system and the rearward end thereof terminating in said control housing thereby permitting an image of an object operatively formed by said image forming optical system on the forward end of said image transmitting optical system and being transmitted therethrough to the rearward end thereof to be viewed in said proximal end portion;

said controllably bendable le tube being operatively controllably bent by string means secured at the forward end thereof to the rearward end of said distal end portion and extending through said controllably bendable tube and said yieldably flexible tube to said control housing so as to be connected at the rearward end thereof to said control housing;

said string means being slidably mounted in substantially non-contractable coil members attached to the interior of said controllably bendable tube and terminating with the forward end thereof at the forward end of said second bendable tube section while the rearward end thereof is secured to said control housing, the length of said non-contractable coil members extending through said yieldably flexible tube together with said string means and unattached thereto thereby permitting said controllably bendable tube to be bent exactly in response to the actuation of said string means by said manipulating means while said yieldably flexible tube is freely bent following the curvature of the passage through which said distal end portion is inserted without any interferene with the operation of said string means; and means provided in said control housing and connected to said string means to manipulate said distal end portion to the extremity of said substantially U-shaped passage of the bronchus.

* * * * *